United States Patent
Almbladh

(10) Patent No.: US 8,121,424 B2
(45) Date of Patent: Feb. 21, 2012

(54) SYSTEM, COMPUTER PROGRAM PRODUCT AND ASSOCIATED METHODOLOGY FOR VIDEO MOTION DETECTION USING SPATIO-TEMPORAL SLICE PROCESSING

(75) Inventor: Johan Almbladh, Lund (SE)

(73) Assignee: Axis AB, Lund (SE)

( * ) Notice: Subject to any disclaimer, the term of this patent is extended or adjusted under 35 U.S.C. 154(b) by 676 days.

(21) Appl. No.: 12/273,220

(22) Filed: Nov. 18, 2008

(65) Prior Publication Data
US 2010/0080477 A1   Apr. 1, 2010

Related U.S. Application Data

(60) Provisional application No. 61/100,579, filed on Sep. 26, 2008, provisional application No. 61/100,575, filed on Sep. 26, 2008.

(51) Int. Cl.
    *G06K 9/36* (2006.01)
(52) U.S. Cl. ............... 382/236; 382/232; 382/240
(58) Field of Classification Search ............ 382/232, 382/240, 236; 348/607, 699; 375/240.11, 375/E7.04, E7.107, E5.081
See application file for complete search history.

(56) References Cited

U.S. PATENT DOCUMENTS

| | | | |
|---|---|---|---|
| 5,574,762 A | 11/1996 | Sato et al. | 377/6 |
| 6,421,466 B1 * | 7/2002 | Lin | 382/236 |
| 6,456,328 B1 * | 9/2002 | Okada | 348/699 |
| 6,560,371 B1 * | 5/2003 | Zhang et al. | 382/240 |
| 6,904,159 B2 | 6/2005 | Porikli | 382/103 |
| 7,613,325 B2 | 11/2009 | Iwasaki et al. | 302/103 |
| 2006/0115116 A1 | 6/2006 | Iwasaki et al. | 382/103 |
| 2007/0230781 A1 | 10/2007 | Yamamoto | 382/173 |
| 2010/0034423 A1 | 2/2010 | Zhao et al. | 382/154 |

FOREIGN PATENT DOCUMENTS

| | | |
|---|---|---|
| EP | 1 845 477 A2 | 10/2007 |
| JP | 7-46582 | 2/1995 |
| JP | 8-123935 | 5/1996 |
| WO | WO 2005/020152 A1 | 3/2005 |
| WO | WO 2008/057107 A2 | 5/2008 |

OTHER PUBLICATIONS

C. Stauffer and W.E.L. Grimson Adaptive background mixture models for real-time tracking Proceedings of the IEEE Conference on Computer Vision and Pattern Recognition (CVPR), p. 246-252, 1999.

Edward H. Adelson, James R. Bergen Spationtemporal energy models for the perception of motion. Journal of optical America, 1985. vol. 2 No. 2: p. 284-299.

(Continued)

*Primary Examiner* — Anh Ohng Do
(74) *Attorney, Agent, or Firm* — Oblon, Spivak, McClelland, Maier & Neustadt, L.L.P.

(57) ABSTRACT

A system, computer program product and associated methodology for video motion detection combines a series of images of a video sequence into an image volume having vertices of X, Y and t. The image volume is sliced in either the (X,t) or (Y,t) planes, filtered with a spatio-temporal filter and thresholded to reduce the amount of information. Then a search algorithm searches along search lines in a subset of the video sequence to locate motion. Motion can be detected by identifying lines that are not parallel to any of the vertices. Stationary subjects and lighting changes appear as lines parallel to one of the vertices. Thus, true motion can be distinguished from lighting changes.

33 Claims, 11 Drawing Sheets

OTHER PUBLICATIONS

Aissa Saoudi, Hassane Essafi Spatio-Temporal Video Slice Edges Analysis for Shot Transition Detection and Classification, Proceedings of World Acasdemy of Science, Engineering and Technology, vol. 22, Jul. 2007, pp. 45-50.

T. Collins Analysing Video Sequences using the Spatiotemporal Volume MSc Informatics Research Review, 2004, pp. 1-28.

Andrés Bruhn, et al., "Towards Ultimate Motion Estimation: Combining Highest Accuracy with Real-Time Performance", Tenth IEEE International Conference on in Computer Vision, vol. 1, 2005, pp. 749-755.

Chong-Wah Ngo, et al., "Motion Analysis and Segmentation Through Spatio-Temporal Slices Processing", IEEE Transactions on Image Processing, vol. 12, No. 3, Mar. 2003, pp. 341-355.

P. KaewTraKulPong, et al., "An Improved Adaptive Background Mixture Model for Real-time Tracking with Shadow Detection", Video Based Surveillance Systems: Computer Vision and Distributed Processing, Kluwer Academic Publishers, Sep. 2001, pp. 1-5.

Yann Ricquebourg, et al., "Real-Time Tracking of Moving Persons by Exploiting Spatio-Temporal Image Slices", IEEE Transactions on Pattern Analysis and Machine Intelligence, XP 000976487, ISSN:0162-8828, vol. 22, No. 8, Aug. 1, 2000, pp. 797-808.

Indranil Chakravarty, "A Single-Pass, Chain Generating Algorithm for Region Boundaries", Computer Graphics and Image Processing XP-002124185, vol. 15, No. 2, Jan. 1, 1981, pp. 182-193.

D.H. Baliard, et al., "Computer Vision", Prentice-Hall, ISBN, 0-13-165316-4, 1982, pp. 75-88.

Agustin Trujillo, "Thin Edge Detector", Image Analysis and Processing, IEEE Comput. Soc. US., XP010354268, ISBN: 978-07695-0040-9, Sep. 27, 1999, pp. 1051-1054.

Sourabh A. Niyogi, et al., "Analyzing and Recognizing Walking Figures in XYT", A, Proceedings of the Computer Society, Conference on Computer Vision and Pattern Recognition, IEEE COMPo Soc. Press, ISBN: 978-0-8186-5827-3, XP000515879, Jun. 21, 1994, pp. 469-474.

Chong-Wah Ngo, et al., "Motion Characterization by Temporal Slices Analysis", Proceedings IEEE Conference on Computer Vision and Pattern Recognition, CVPR 2000, (Cat.No. PR00662), ISBN:0-7695-0662-3, XP002569817, vol. 2, 2000, pp. 768-773.

Dennis J. Wenzel, et al., "High Speed Extraction of Line Segment Features", Proceedings of the SPIE—the International Society for Optical Engineering USA, vol. 2064, ISSN: 0277-786X, XP002569818, 1993, pp. 47-58.

\* cited by examiner

SYSTEM, COMPUTER PROGRAM PRODUCT AND ASSOCIATED METHODOLOGY FOR VIDEO MOTION DETECTION USING SPATIO-TEMPORAL SLICE PROCESSING

CROSS-REFERENCE TO RELATED APPLICATION

This application contains subject matter related to U.S. Patent Application Ser. No. 61/100,575, entitled "Video Analytics System, Computer Program and Associated Methodology for Efficiently Using SIMD Operations", filed on Sep. 26, 2008, the entire contents of which being incorporated herein by reference.

This application also claims the benefit of the earlier filing date of U.S. Provisional Application Ser. No. 61/100,579, entitled "System, computer program product and associated methodology for video motion detection using spatio-temporal slice processing", filed on Sep. 26, 2008, the entire contents of which is incorporated herein by reference.

BACKGROUND

1. Field of the Invention

The present disclosure relates to video analytics, and, more specifically, a system, computer program product and methodology for detecting motion in videos using spatio-temporal slice processing to make the detection illumination-invariant.

2. Description of the Related Art

Video analytics extends beyond encoding and decoding video for desktop computer systems. Video analytics are techniques for analyzing content in still and video images, and are used to do more than determine a proper frame rate, resolution, and the like. In video analytics, image and video are analyzed for content, such as motion of items in an image(s). Often, uninteresting portions of a video are discarded, while other portions are analyzed in detail to extract relevant information, such as motion.

Specifically, motion detection involves identifying spatial regions of images in a video sequence that are moving in an image space. This can include, for example, swaying trees and moving shadows, but not lighting changes or image noise. The problem of motion detection is made more complex by situations where a region of a video, stationary in all preceding frames, suddenly moves from one frame to the next. The inverse problem is also possible, i.e. a region in motion for many frames may stop abruptly.

Many currently available motion detection methods and systems detect change rather than motion. These methods merely search for a difference in a region of an image between frames, or between a current frame and a series of preceding frames. For example, in the background subtraction method, a background or reference image is constructed from a set of previous frames in a video using, for example, an Infinite Impulse Response (IIR) filter. Then detection is performed by applying a threshold to the absolute difference between a current image and the background or reference image. The threshold may be a simple, binary function where the result is a "1" if the difference surpasses the threshold, and "0" otherwise.

Other methods attempt to model the background using, for example, Gaussian distributions having a mean and a variance value. In the Gaussian Mixture Model, each pixel is represented by several Gaussian distributions, and each Gaussian distribution is weighted according to its variance and how many times it is observed. A pixel that does not fit within the background model unless its weight is reduced below a certain threshold is considered a foreground pixel likely to contain motion information.

As recognized by the present inventor, methods that detect change and methods that attempt to model the background image are both very sensitive to changes in lighting. These methods simply cannot distinguish between "true" image changes and lighting effects while processing individual pixels.

Moreover, also as recognized by the present inventor, motion estimation methods, which are usually based on comparing only two consecutive images, such as optical flow, which determine velocities for image regions in motion, are very computationally demanding, inaccurate or both. With more than two consecutive images being analyzed the computational demand is considered to be too high for practical application.

Most currently available spatio-temporal filters analyze images individually and they use a high-level model to handle the temporal aspects, and the few spatio-temporal algorithms that simultaneously process a video spatially and temporally are too computationally demanding for real-time embedded processing.

SUMMARY OF THE INVENTION

In view of the foregoing, an object of the present disclosure is to provide a system, computer program product, and associated methodology for video motion detection capable of correctly identifying motion in environments with heavy illumination changes, and doing so efficiently.

An exemplary video motion detecting method combines a plurality of images of a video into an image volume. Each of the plurality of images includes a plurality of pixels, and the image volume has dimensions X corresponding to width, Y corresponding to height, and t corresponding to depth. After being formed the image volume is sliced along the (X,t) plane, and a logarithmic transform is optionally performed on each pixel to separate a reflectance components from an illumination component.

A spatio-temporal filter is then applied to the sliced image volume, generating a filtered result. After filtering, the absolute value of the filtered result is put through a threshold function to generate a binary image that includes well defined spatio-temporal edges. Lastly, the binary image is searched for at least one connected string of pixels. A connected string of pixels that is not parallel to any of the axes indicates motion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
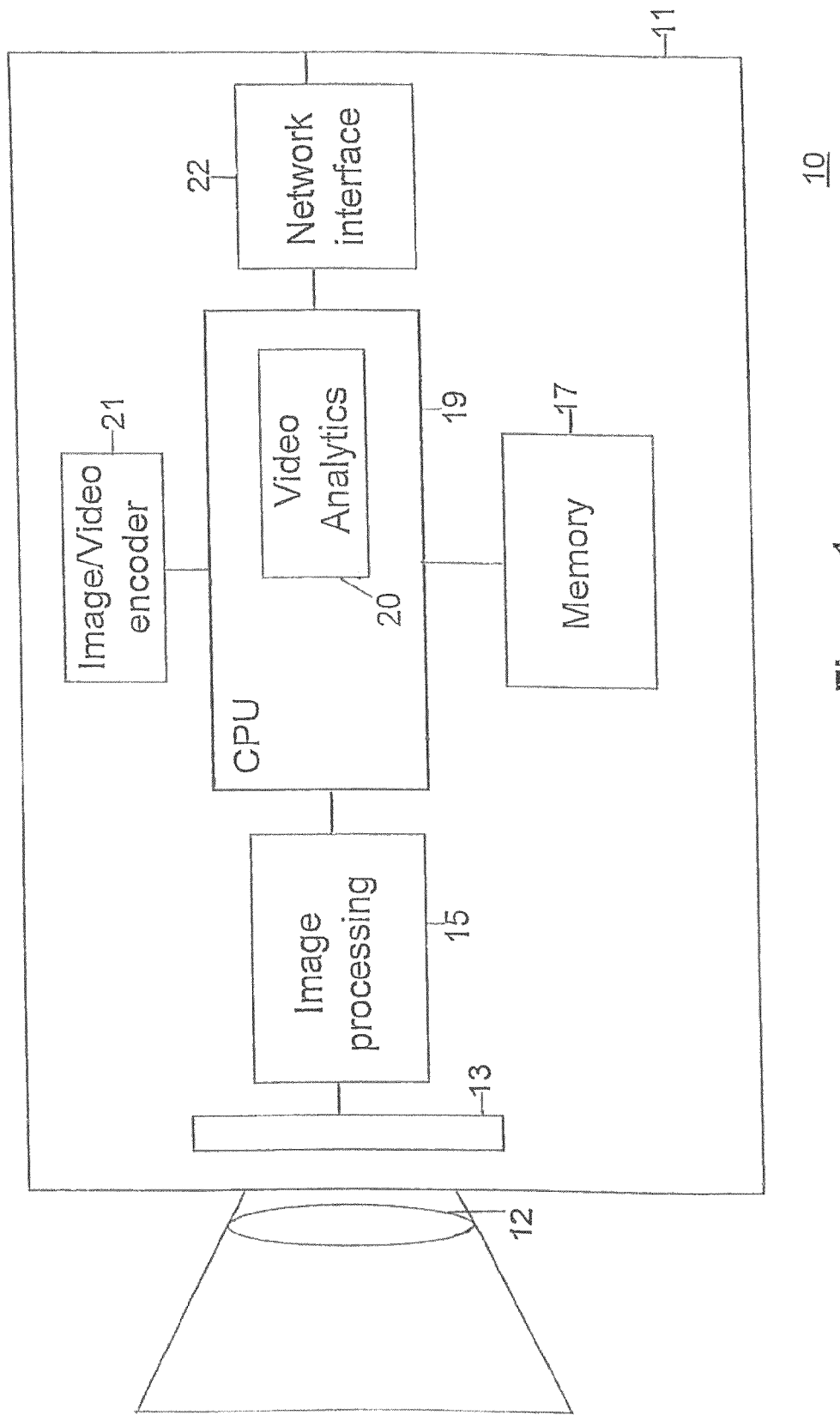
FIG. 1 is a block diagram of a network camera according to an embodiment of the present invention.

Referring now to the drawings, wherein like reference numerals designate identical or corresponding parts throughout the several views. FIG. 1 is a block diagram of a network camera 10 (or an IP-camera) that may be used to capture images according to the present invention. More generally, however, the camera 10 may be any digital camera capable of generating image sequences and communicating the image sequences or image data from the image sequences, such as for example image meta data, over a network (private, public, or hybrid) to a user client (51, FIG. 3). The term "video" in the present context is not limited to conventional motion pictures, but also includes still frames captured in time sequence (such as one per second, one per two seconds, etc.) The network camera 10 includes a local video analytics module 20, shown in this embodiment as being implemented as a software based process on a processor 19. However, a hardware, firmware, or hybrid module may be used as well.

The network camera 10 includes a lens system 12 for collecting incident light, an image sensor 13, e.g. a Charge Coupled Device (CCD), a CMOS-sensor or similar sensor, for registering incident light, an image processing module 15 (implemented in hardware, software, or hybrid approach), an image/video encoder 21, a CPU 19 that manages, for example video analytics 20, memory 17, and a network interface 22. The image sensor 13 could also be an IR-sensor for detecting infrared radiation. The image/video encoder 21 is arranged to encode captured digital image data into any one of a plurality of known formats for continuous video sequences, for limited video sequences, for still images or for streamed images/video. For instance, the image information may be encoded into MPEG1, MPEG2, MPEG4, H.264, JPEG, M-JPEG, bit-mapped, etc.

An analog camera (54, shown in FIG. 3), capable of generating analog image sequences, and a converter 57, such as a video server or a video encoder, could also be used with, or as a substitute for, the network camera 10. The converter transforms the analog image sequences from the analog camera 54 to digital image sequences or image data and providing the digital image sequences or image data to the network. In this case the video/image encoding and local analytics are performed in the converter.

Figure 2:
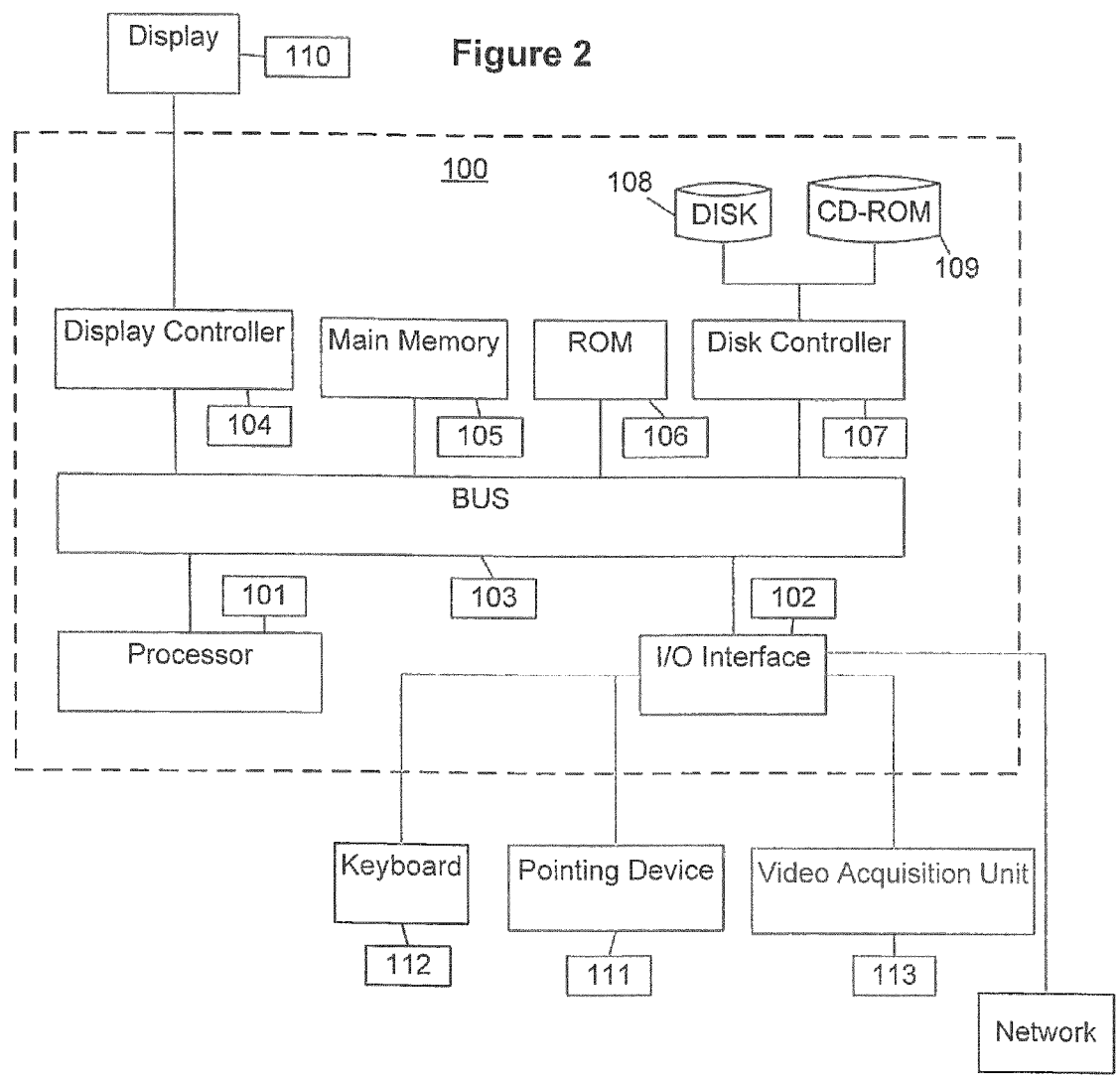
FIG. 2 is a block diagram of a surveillance center computer, or a client computer according to an exemplary embodiment of the present disclosure.

FIG. 2 is a schematic diagram of a client computer, or surveillance center computer according to the present embodiment. The computer 130 includes a computing device 100 to which a keyboard 112, pointing device 111, video acquisition unit 113 and a display 110 are connected.

The computing device 100 includes a processor 101 that performs control processes and in connection with a main memory 105 for temporary storage of data being processed, and ROM 106 storing the instructions executed by the processor 101. A disk controller 107 controls at least a disk 108 and a CD-ROM 109 where video sequences may be stored before and after processing. A display controller 104 is used to control an external display 110, and an I/O interface is used to control other external devices, such as a keyboard 112, a pointing device 111 and a video acquisition unit 113. A bus 103 interconnects all of these components.

The computing device 100 may be, for example, a PC employing a Pentium processor. The instruction set stored in ROM 106 may be provided as a utility application, background daemon or component of an operating system, or combination thereof executing in conjunction with a processor and operating system such as VISTA, UNIX, SOLARIS, LINUX, APPLE MAC-OS and other systems known to those skilled in the art.

The main memory 105 of the computing device 100 may be dynamic or static random access memory (RAM) integral to the PC, or may be other memory devices such as FLASH, EEPROM, optical disk, servers, and the like. Additionally, at least part of the main memory 105 may also be detachable from the video motion detecting system.

The video motion detecting system may also be implemented on hardware devices such as FPGA's, ASIC's, microcontrollers, PLD's or other such processing devices(processors).

Examples of a video acquisition unit 113 include a video camera, a video cassette recorder (VCR), a Digital Versatile Disc (DVD) recorder, and the like. Examples of a pointing device 111 include a mouse, track ball, touch pad, etc., and a display 110 may for example be a video monitor.

Figure 3:
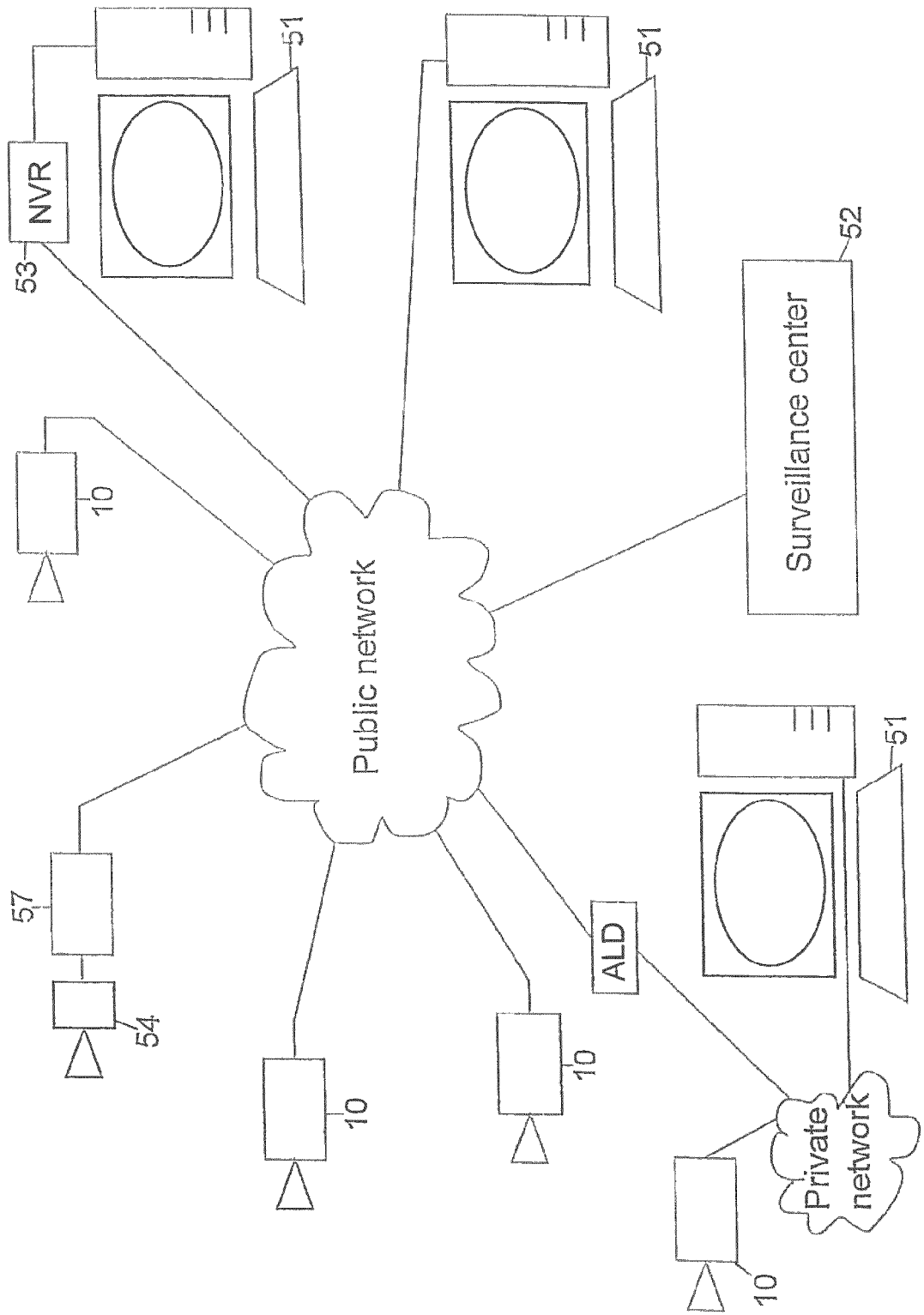
FIG. 3 is a block diagram of a surveillance system according to an embodiment of the present invention.

As shown in FIG. 3, a network camera 10 can either be locally connected via a private network or remotely connected via a public network to one or more user clients 51. The network interface of the network camera enables communication between the camera and the user client of not only images or video but also control data of pan/tilt/zoom mechanisms, audio, image and video settings etc. The user client 51 could for example be a surveillance center 52, a client computer 51 or a Network Video Recorder (NVR) 53, may be a server for storing, manipulating and/or relaying image sequences from a camera). FIG. 3 is intended to show different user clients that may interact with a monitoring camera. A network camera can serve more than one user client with for example images and video.

Video analytics applications, such as motion detection, are based on analysis of images from the image sequences captured by the network camera 10 or the analog camera 54. The analysis of the images may be performed in the network camera, in the surveillance center 52, in the client computer 51 or in the NVR 53. However, it may be advantageous to perform the video analytics in the network camera 10 or in the converter 57 because the video analytics may be performed without loading the network with traffic using a lot of bandwidth. Hence, this advantage is particularly relevant for applications in which the user is not interested in being continuously provided with image sequences, e.g. in applications where the user only is provided with image sequences if something happens in the camera view. With video analytics applications in the network camera 54 or converter 57 extraction of meta data, i.e. data about the images (like for example data describing what happens in the image sequence), is enabled. The transmission of image sequences from the camera to a user could then be substituted by meta data under certain conditions (for example when there are no alarms). Systems not sending image sequences continuously may be provided in order to save bandwidth or in order to facilitate scalability of the system, because it is easier to add further network cameras to such a system. An alternative embodiment, however, has the client computer 51 and/or the surveillance center 52 performing the video analytics.

Next, a video motion detection method which may be executed on the video motion detection system of FIG. 1 is described.

Figure 4:
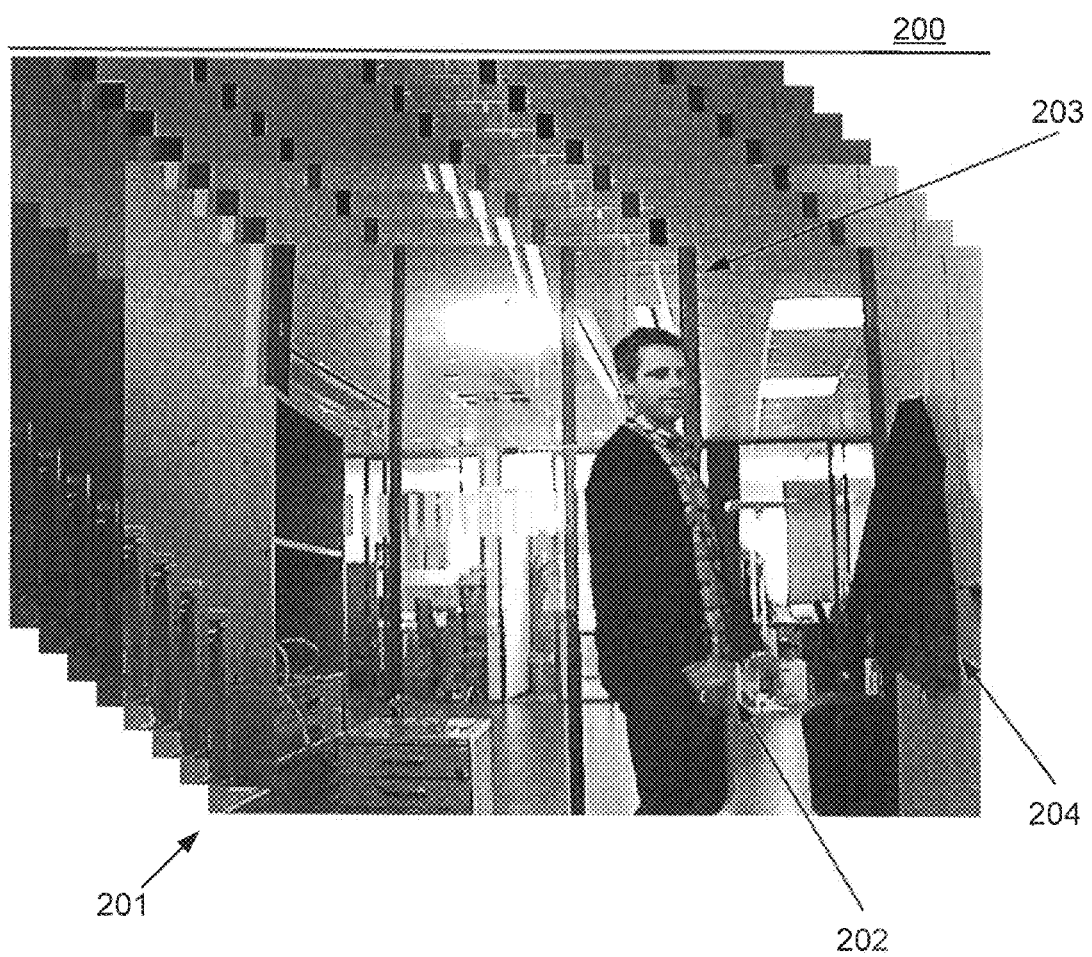
FIG. 4 is an exemplary collection of images from a video sequence.

FIG. 4 is a collection of images 201 of a video sequence 200 captured by, for example, the video acquisition unit 113 of the video motion detecting system. In this non-limiting example, the subject of the video sequence 200 includes a person 202, a jacket 204 and a vertical column 203. Of course, as can be appreciated by one of ordinary skill in the art, the method may also process images containing other subject matter. Further, the images 201 may be arranged with the most recent image in front of the others, or with the most recent image behind all of the others.

Figure 5:
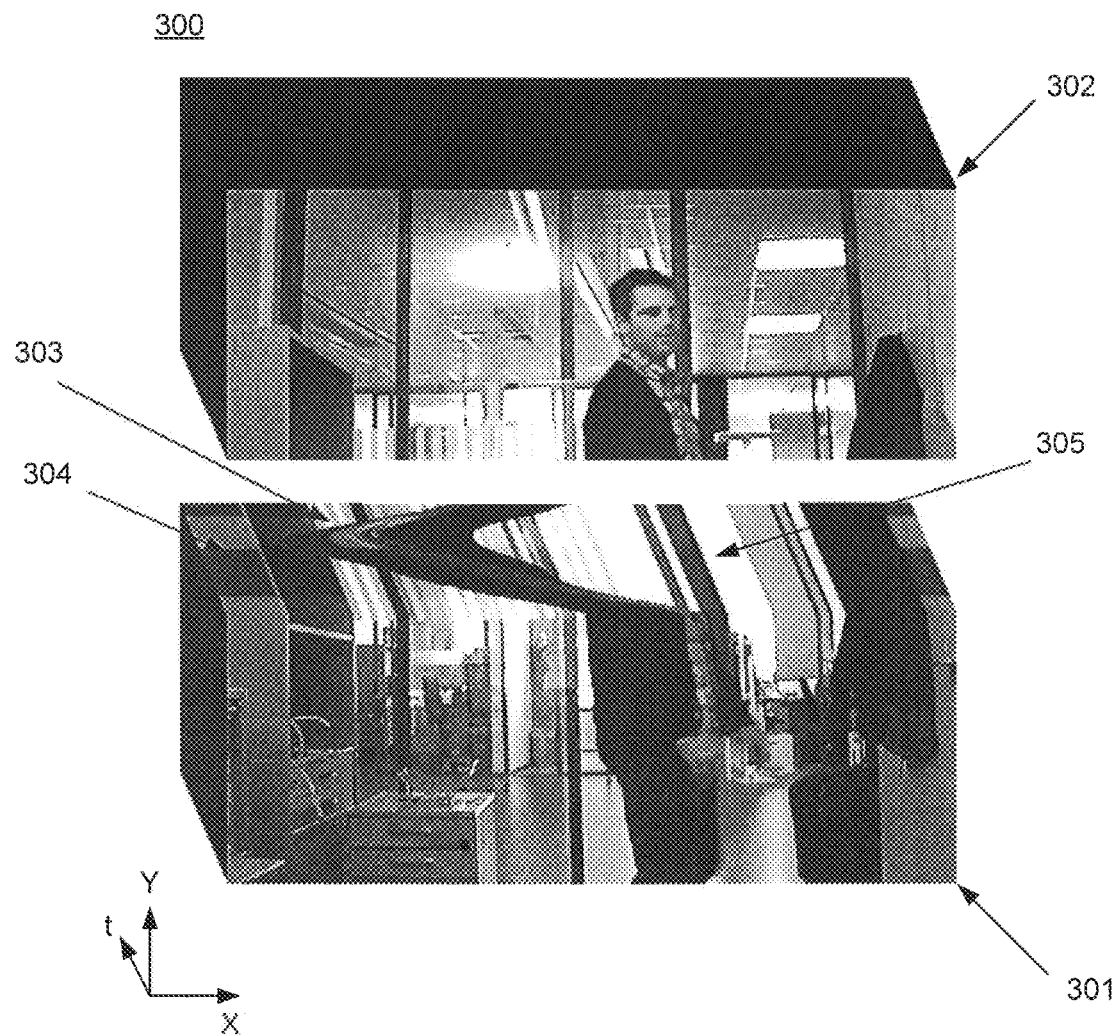
FIG. 5 is an image volume that is sliced according to an exemplary embodiment of the present disclosure.

In FIGS. 4 and 5, the images 201 of video sequence 200 are combined to form an image volume 300. The video sequence 200 comprise images 201 $I_1, I_2, \ldots I_N$, where N is equal to or greater than 3. Then the image volume 300 is sliced along the (X,t) plane to form two image volume portions 301 and 302. However, the image volume 300 may also be sliced along the (Y,t) plane without departing from the scope of the present disclosure.

The top of the image volume 301 includes the column 305, the person 303 and at least one dark, horizontal line 304 (parallel to the Y axis). The column 305 is stationary, and thus forms a line parallel to the t axis (i.e. the time axis). However, the person 303 has moved during acquisition of the video sequence 200. As a result, the person 303 forms a curve along the top of the image volume portion 301 that is not parallel to any axis.

The dark horizontal lines 304 represent lighting changes. For example, line 304 is the result of diminished lighting. However, as recognized by the present inventor, such lighting changes are always parallel to the X or Y axis, and can therefore be readily identified as a lighting change, not motion, and suppressed. Such suppression of lighting changes is not possible with difference detection or motion estimation methods.

After the image volume 300 is sliced into image volume portions 301 and 302, a logarithmic transformation is applied to each pixel in the two image volume portions 301 and 302 to separate a reflectance component and an illumination component. Optionally, the illumination component may be suppressed by high-pass filtering the pixels in the image volume 300.

Figure 6:
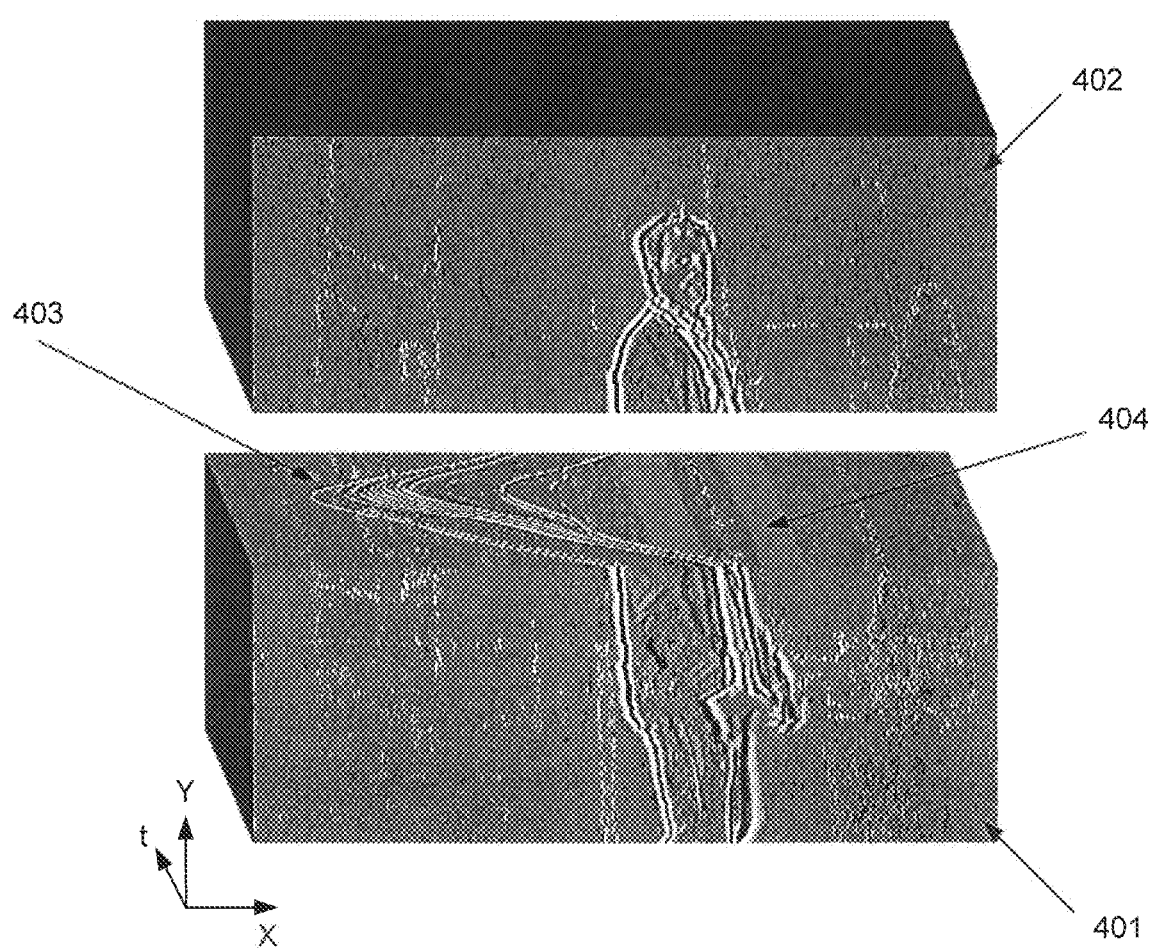
FIG. 6 is a sliced image volume that has been filtered by a spatio-temporal filter according to an exemplary embodiment of the present disclosure.

Next, the image volume 300 is filtered with a spatio-temporal filter to yield the image volume 400 of FIG. 6. The spatio-temporal filter is an edge enhancing filter. As such, the spatio-temporal filter enhances the edges of the person 403, and the column 404.

For example, Spatio-temporal filtering may be accomplished using a 3×3 Sobel filter kernel. Further, spatio-temporal filtering may also be accomplished using the method described in Application Ser. No. 61/100,575, which employs Single Instruction Multiple Data (SIMD) instructions to simultaneously process multiple pixels while holding a number of bits per pixel constant throughout filtering.

Figure 7:
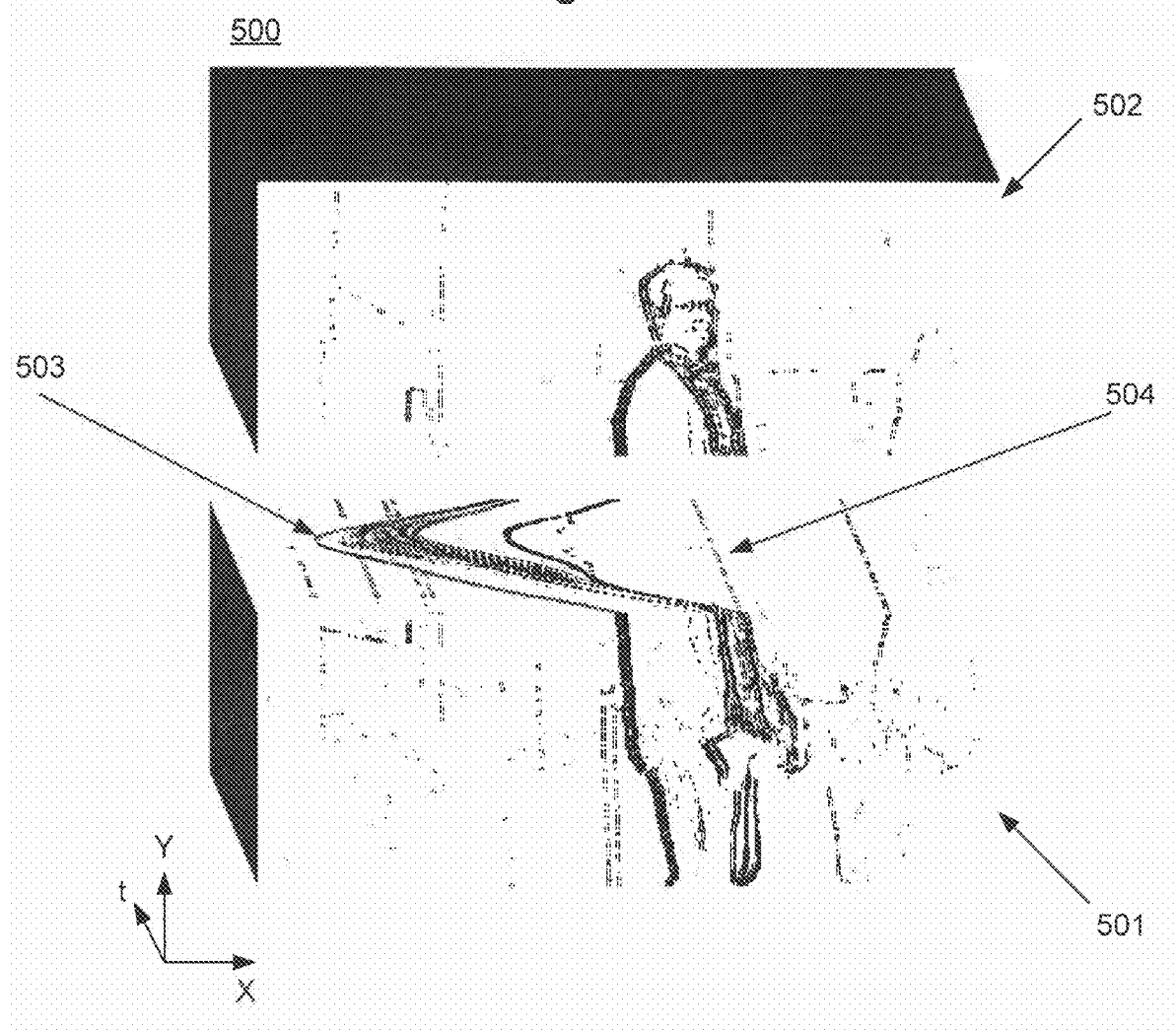
FIG. 7 is a sliced image volume to which a threshold has been applied after filtering according to an exemplary embodiment of the present disclosure.

After filtering with the spatio-temporal filter, or together as part of the filter, a threshold function is applied to the pixels of image volume 400 for data reduction. FIG. 7 is the resulting image volume 500. The threshold functions further accentuates edges through a binary representation of each pixel. For example, pixels that meet a predetermined threshold value (e.g. ≧50% gray value) are given a value of "1" (black) and pixels that fall below the threshold are given a value of "0" (white). In image volume 500, the edges that define the person 503 are clearly distinct from their surroundings, as are the edges that define the column 504. This allows for more efficient searching of the image, as described below since each pixel is now represented by only a "1" or a "0".

Figure 8:
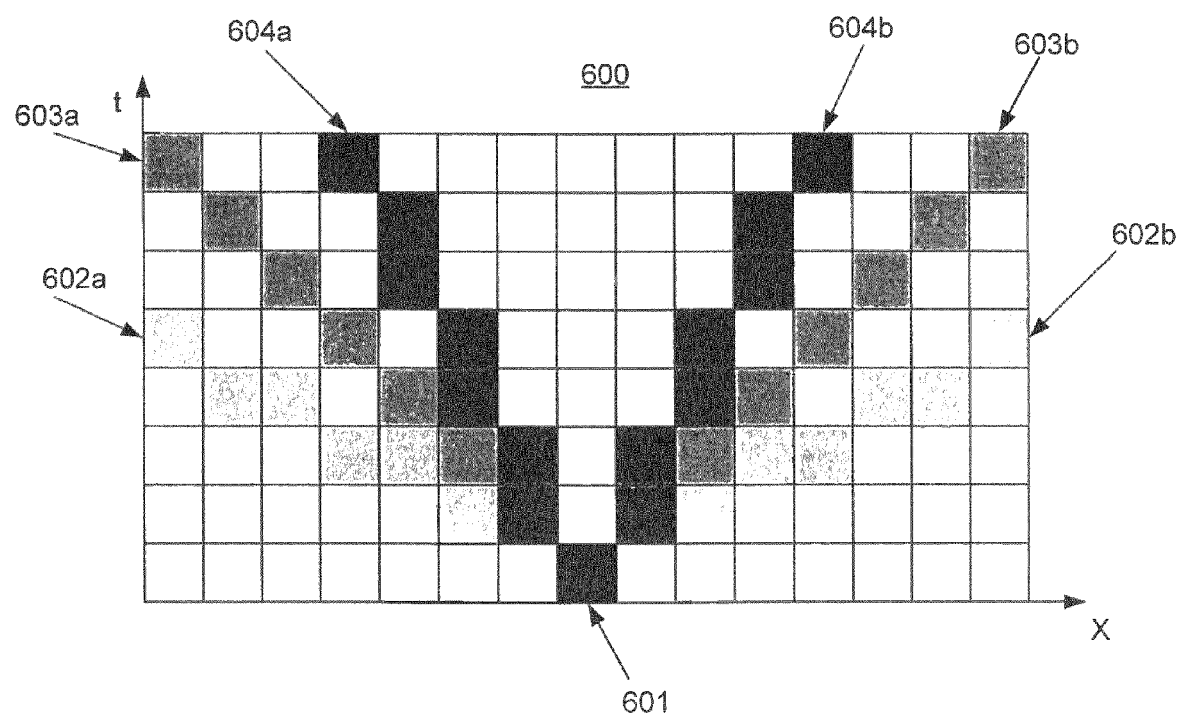
FIG. 8 is a rasterized series of search lines according to an exemplary embodiment of the present disclosure.

FIG. 8 is an image portion 600, in the (X, t) plane, that has been processed as described above. Pixel 601 is identified in this example as the starting pixel. From pixel 601 rasterized search lines 602a, 602b, 603a, 603b, 604a and 604b extend to the edge of the image portion 600. Searching involves identifying strings of pixels along the search lines that all have a value of "1" (i.e. that are all black.) The string of pixels must be of a predetermined length (such as a number of linearly arranged pixels across an image being searched, or a specific number, such as 3, 5, 8 (shown), or 10 pixels) for the method to identify it as representing motion. For example, a string may be required to be as long as the image portion 600 being searched, which is a maximum of 8 pixels in the example. However, shorter or longer detection string sizes may be used as well in the present embodiment. Further, a single break in the string may be sufficient for the string to be disregarded as an artifact, noise, etc.

The size of the image portion 600 being searched determines the accuracy and noise-susceptibility of motion identification. If the area is small, (such as 3, or 2 pixels in a direction) the likelihood is greater of obtaining more positive detection results, but those detection results are more susceptible to corruption by noise than longer detection strings. Larger (e.g. areas having between 8, 9 or 10 pixels in a direction) image portions 600 are more immune to noise disturbance, but result in fewer detection results. However, any positive detection result for a longer contiguous string provides more reliable detection information than a shorter string.

Additionally, angles corresponding to the search lines (602a, 602b, 603a, 603b, 604a and 604b) may be varied over a range (e.g. 30° to 60°) to detect motion of differing velocities.

Figure 9:
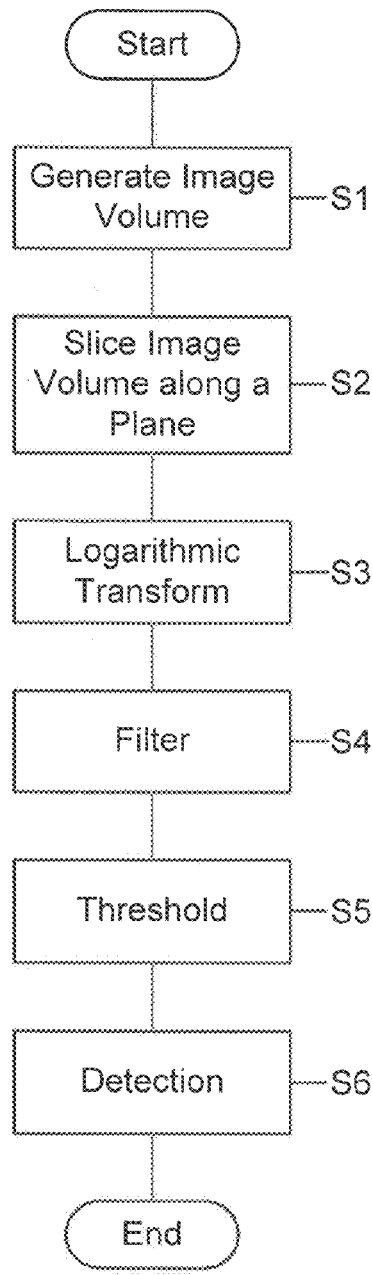
FIG. 9 is a flowchart of a video motion detecting method according to an exemplary embodiment of the present disclosure.

FIG. 9 is a flowchart of the above-described process. In step S1, the plurality of images 201 of video sequence 200 are combined onto an image volume 300. The image volume 300 is sliced along one of the (X,t) plane or the (Y,t) plane in step S2. The image volume 300 is subjected to a logarithmic transformation at step S3, and filtered by the spatio-temporal filter at step S4 to generate a filtered image volume 400. The threshold function is applied to the filtered image volume 400 at step S5 and detection of motion (in either (X,t) or (Y,t)) is carried out in step S6. By changing the direction of slicing from (X,t) to (Y,t) and vice versa a complete motion detection analysis is performed on the video sequence.

Figure 10:
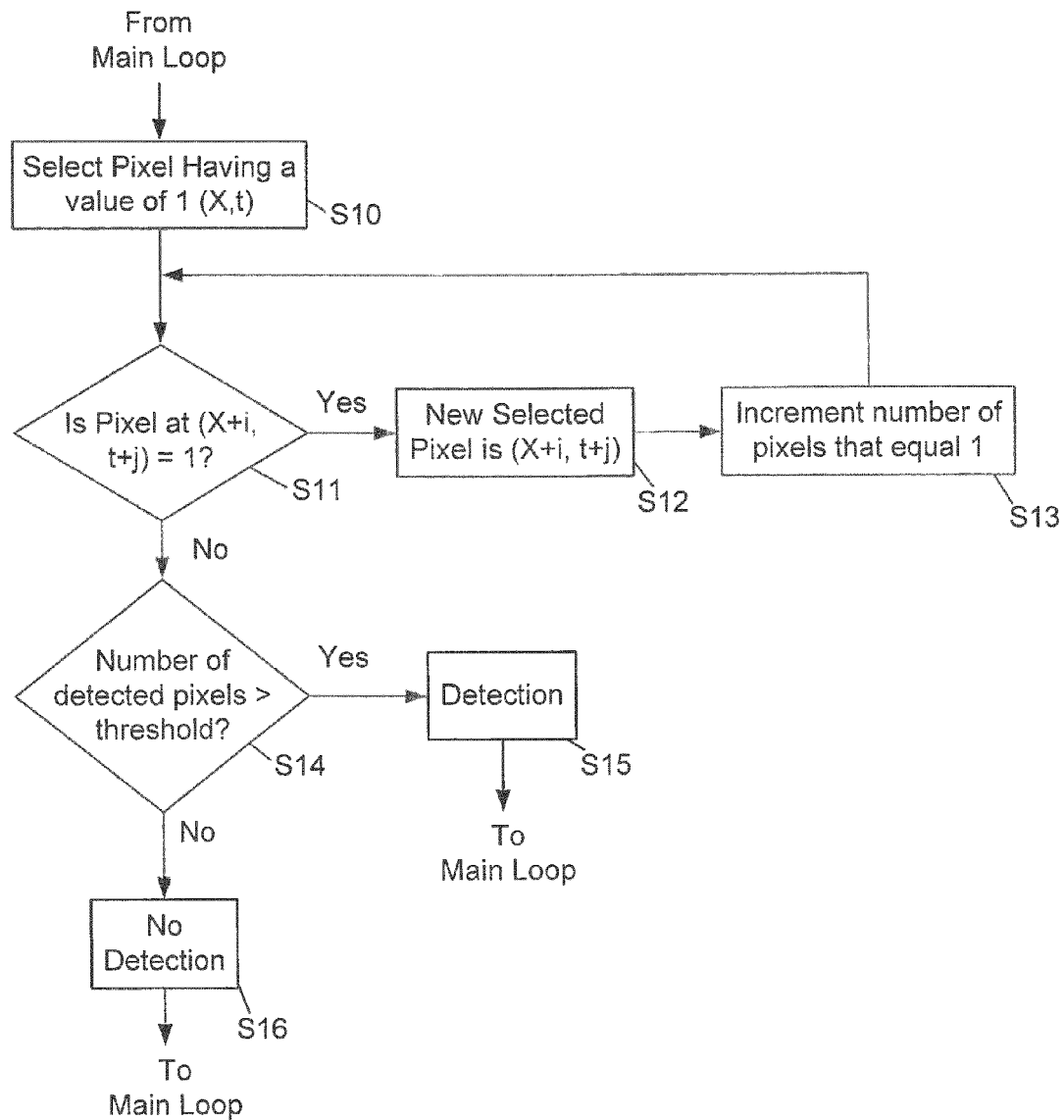
FIG. 10 is a flowchart of a search in the (X,t) direction according to an exemplary embodiment of the present disclosure.

FIG. 10 is a flowchart of the detection performed in step S6 of FIG. 9 in the case of slice processing along an (X,t) plane. At S10 a pixel having a value of "1" is selected as a starting point. The adjacent pixel at location (X+i, t+j) is probed to determine whether its value is a "1" or a "0" at step S11. If its value is a "1" this pixel is selected as the new starting point at step S12, and a counter that keeps track of the number of adjacent pixels identified with a value of "1" is incremented at step S13. Then steps S11-S13 are repeated until the entire search line is searched.

The index variables i and j may be incremented by 1 or 2 in order to implement the search lines of FIG. 8. For example, search line 602b is generated when the increment for i is 2 and the increment for j is 1. The search line 603b is generated when the increment for both i and j is 1, etc. Other values for i and j are possible, however, to implement search lines with different angles.

Once a search line is fully searched, the number adjacent pixels having a value of "1" is compared to a threshold at S14, and if this number surpasses the threshold, motion is detected at S15. However, if this value falls below the threshold, no motion is detected (step S16). The search repeats for every search line until all are exhausted, and then execution is returned to the main loop.

Figure 11:
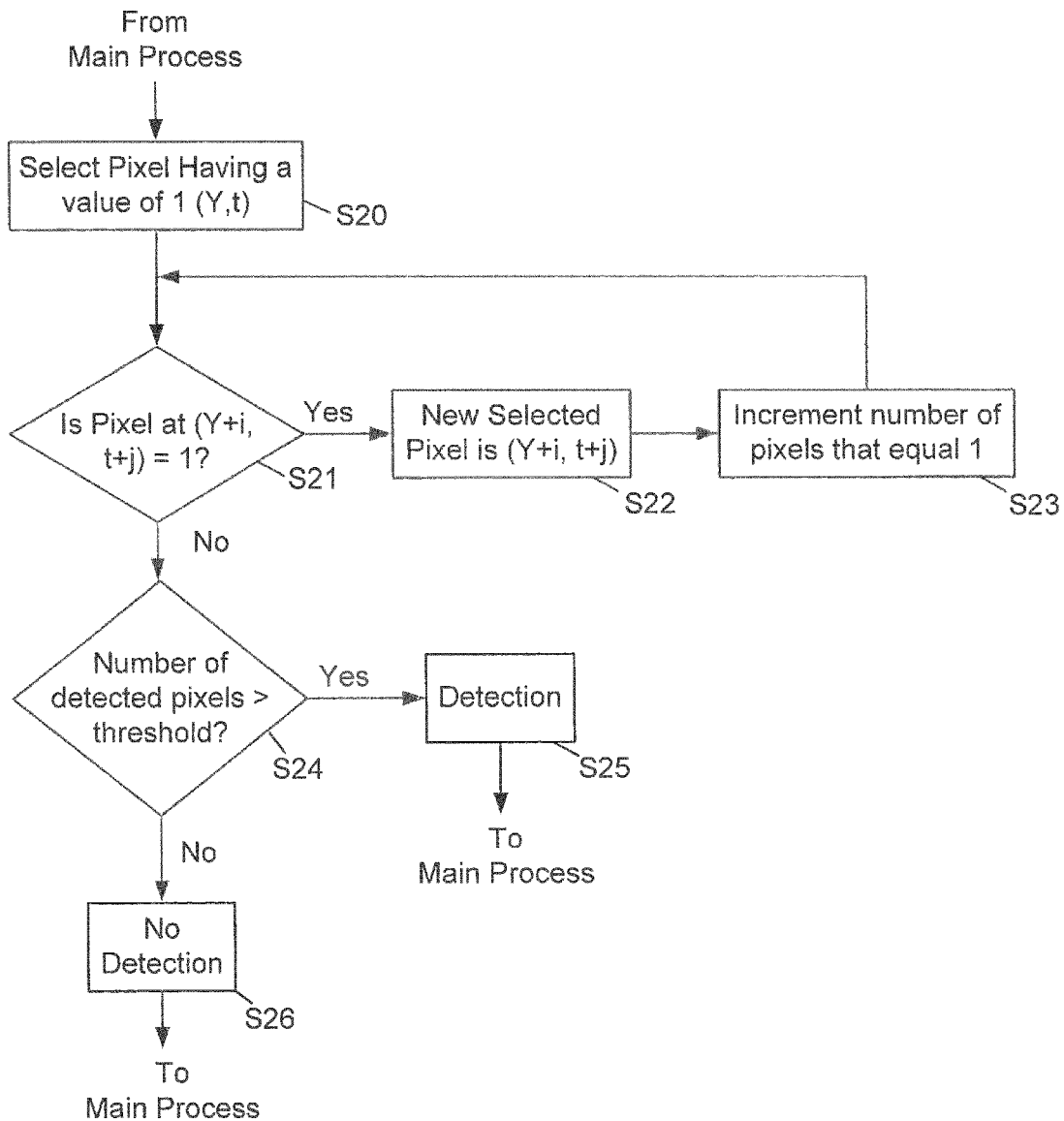
FIG. 11 is a flowchart of a search in the (Y,t) direction according to an exemplary embodiment of the present disclosure.

FIG. 11 is a flowchart of the search process in the (Y,t) direction. As in the above-described case, a pixel with a value of one is selected as a starting point at S20. The next adjacent pixel (Y+i, t+j) is probed to determine whether its value is a "1" or a "0" at step S21. A "1" will cause pixel (Y+i, t+j) to be selected as the next starting point at S22, and a pixel counter to increment at step S23. Once a search line in exhausted the value of the pixel counter is compared to a threshold at S24. A detection occurs at S25 when the value is higher that the threshold. Otherwise no motion is detected (S26). Steps S21-S23 repeat until the search line is exhausted.

As in the case of the (X,t) search, the values of i and j can be 1 or 2 to implement the search lines of FIG. 8. However, other values are possible. Once all search lines are exhausted, control reverts to the main loop.

The above-described search can be performed in concentric circles of expanding image areas to increase the likelihood of detection without appreciably reducing accuracy. Presume there is a two-dimensional detection area, defined by axes X and Y. In the search area, a number of short and long detection strings will be present. As a method for efficiently detecting edges, the longer detection strings may be used as "seeds" to be used for focusing-on areas to be analyzed. Moreover, once a longer string is detected, that longer string is a significant finding that an edge is present with high probability. Then, anchored in a search region by the long detection string, circular areas around the long detection string may be searched for lower confidence samples. The reasoning behind this search strategy is that the longer detection strings have a high probability of being accurate, and therefore are more likely to be indicative of an actual edge. Since an edge has been detected with high confidence in this area, it is reasonable to presume that other parts of the edge will be located in a nearby area. It follows that short detection strings located in more remote, isolated portions of the detection area, are more likely to be the product of noise, and therefore not as likely to be caused by an actual edge.

In one embodiment, the present inventor recognized an advantage of representing each pixel by one bit. Namely continuous lines throughout the detection range are detected by logical AND operations of adjacent rows in the detection area. For example, contiguous string 603b may be detected by a series of AND operations on different data rows (in the t direction). Thus, through straight-forward Boolean logic, contiguous detection strings are readily identifiable though a series of AND operations. Likewise, once the detection strings are formed in the area 600, the presence of any single string of sufficient length (in this case, a contiguous string from pixel 601 to the edge of the area 600) is identifiable by a logical OR for each candidate string. Therefore, if any one string is present, the result of the OR operation indicates that a string of sufficient length is present in the area 600, and consequently, an edge is present and includes pixel 601.

While the present embodiment describes representing one bit per pixel, it is also possible to include multiple pixels per word, such as 32 pixels per word. In this case, parallel searching is performed for diagonal strings originating from pixel 601 and the 31 pixels to its right, for example, along the x-axis. In this case, parallel searches are performed in parallel diagonal directions. It is noted that multiple bits per pixel requires more complicated arithmetic operations, thus increasing the processing demand.

While FIG. 8 shows strings in a straight line, it is also possible to have other patterns of lines detecting motion, not necessarily linear. Such other patterns include partially diagonal lines, which includes one or more diagonal segments, and curved lines.

In another embodiment the search procedure is performed for all pixels in the (X,Y) plane simultaneously in parallel. Starting with the latest edge image in the image volume 500, a logical AND is performed with the next image which has been translated according to the search line and then logically compared, using the AND-operation, to the result of the first AND-operation. This procedure is then repeated to cover a predetermined length of pixels. The search procedure is repeated for different search lines having different directions. Logical OR-operations are used between the different search directions to determine if there is motion detected in any one of the search lines originating from a specific starting pixel. This search procedure may be performed for both translations in the X-direction and in the Y-direction. Using this search procedure an explicit slice step S2 is not necessary in process shown in FIG. 9, since the slicing will be inherent to the detection step S6.

The above described method may also be implemented as computer-readable instructions stored on a computer readable medium.

Conventional video motion detection methods are computationally demanding, inaccurate or sensitive to changes in lighting. However, a video sequence may be combined into an image volume, and sliced along an (X,t) or (Y,t) plane. As the present invention recognized, motion on such a slice appears as a slanted line or curve that is not parallel with any axis (X,Y,t), while lighting changes and stationary objects appear as lines parallel to one of the axes. Therefore, in this method, lighting changes can be identified and suppressed or discounted.

Further, as recognized by the present inventor, searching along search lines, rasterized to the video sequence, allows for improved efficiency over current methods, and lends itself to implementation in embedded systems.

Obviously, numerous modifications and variations of the present invention are possible in light of the above teachings. It is therefore to be understood that within the scope of the appended claims, the invention may be practiced otherwise than as specifically described herein.

The invention claimed is:
1. A video motion detecting method, comprising:
capturing a plurality of images of a video sequence, each of the plurality of images including a plurality of pixels, each pixel being represented by a first number of bits;
reducing the first number of bits to a second number of bits that is less than the first number of bits;
storing in a computer readable medium the plurality of images;
searching with a processor for spatio-temporal edges in a spatio-temporal domain of a predetermined area in the plurality of images; and
detecting motion of a common object in said plurality of images, including
comparing connected strings of pixels have a common value in said predetermined area, and identifying a presence of an edge when at least one string of connected pixels is greater than a predetermined length.

2. The method of claim 1, wherein
said connected string being arranged in a straight diagonal direction.

3. The method of claim 1, wherein
said connected string being arranged in a predetermined pattern other than a straight diagonal line.

4. The method of claim 1, wherein said reducing step includes reducing the first number of bits to one bit per pixel.

5. The method of claim 4, further comprising a step of packing bits representing respective pixels in a common data word that can be processed by a processor in a single operation instruction.

6. The method of claim 1, wherein said identifying step includes identifying an edge when the at least one string of connected pixels is at least as long as a depth of the predetermined area.

7. The method of claim 1, wherein said search step includes searching adjacent pixels in parallel.

8. The method of claim 1, wherein:
said comparing step includes performing a logical AND operation on sets of pixels in said predetermined area; and
said identifying step includes performing a logical OR operation on connected strings of pixels within said predetermined area.

9. The method of claim 1, wherein said reducing step includes:
performing a logarithmic transformation on the plurality of pixels so as to separate reflectance components from an illumination component.

10. The method of claim 1, wherein the reducing step includes a spatio-temporal filtering step.

11. The method of claim 10, wherein the reducing step includes performing a threshold operation on an absolute value of a result of said spatio-temporal filtering step.

12. A non-transitory computer-readable medium having computer-readable instructions thereon, the computer-readable instructions when executed by a processor cause the processor to perform steps comprising:
capturing a plurality of images of a video sequence, each of the plurality of images including a plurality of pixels, each pixel being represented by a first number of bits;
reducing the first number of bits to a second number of bits that is less than the first number of bits;
storing in a computer readable medium the plurality of images;
searching with the processor for spatio-temporal edges in a spatio-temporal domain of a predetermined area in the plurality of images;
detecting with a processor motion of a common object in said plurality of images, including, said detecting step including
comparing connected strings of pixels have a common value in said predetermined area, and
identifying a presence of an edge when at least one string of connected pixels is greater than a predetermined length.

13. The non-transitory computer-readable medium of claim 12, wherein
said connected string being arranged in a straight diagonal direction.

14. The non-transitory computer-readable medium of claim 12, wherein
said connected string being arranged in a predetermined pattern other than a straight diagonal line.

15. The non-transitory computer-readable medium of claim 12, wherein said reducing step includes reducing the first number of bits to one bit per pixel.

16. The non-transitory computer-readable medium of claim 15, further comprising a step of packing bits representing respective pixels in a common data word that can be processed by a processor in a single operation instruction.

17. The non-transitory computer-readable medium of claim 12, wherein said identifying step includes identifying an edge when the at least one string of connected pixels is at least as long as a depth of the predetermined area.

18. The non-transitory computer-readable medium of claim 12, wherein said search step includes searching adjacent pixels in parallel.

19. The non-transitory computer-readable medium of claim 12, wherein:
said comparing step includes performing a logical AND operation; and
said identifying step includes performing a logical OR operation on connected strings of pixels within said predetermined area.

20. The non-transitory computer-readable medium of claim 12, wherein said reducing step includes:
performing a logarithmic transformation on the plurality of pixels so as to separate reflectance components from an illumination component.

21. The non-transitory computer-readable medium of claim 12, wherein the reducing step includes a spatio-temporal filtering step.

22. The non-transitory computer-readable medium of claim 21, wherein the reducing step includes performing a threshold operation on an absolute value of a result of said spatio-temporal filtering step.

23. A camera comprising:
an optics section configured to capture light from a scene containing an object;
a sensor configured to convert said light into a plurality of images of a video sequence, each of the plurality of images including a plurality of pixels, each pixel being represented by a first number of bits;
an image processor configured to reduce the first number of bits to a second number of bits that is less than the first number of bits;
a memory configured to store the plurality of images with the second number of bits per pixel; and
a processor configured to
search said pixels for spatio-temporal edges in a spatio-temporal domain of a predetermined area in the plurality of images, and
detect motion of the object in said plurality of images by comparing connected strings of pixels have a common value in said predetermined area, and identifying a presence of an edge when at least one string of connected pixels is greater than a predetermined length.

24. The camera of claim 23, wherein
said connected string being arranged in a straight diagonal direction.

25. The camera of claim 23, wherein
said connected string being arranged in a predetermined pattern other than a straight diagonal line.

26. The camera of claim 23, wherein said reducing step includes reducing the first number of bits to one bit per pixel.

27. The camera of claim 26, wherein said image processor is configured to pack bits representing respective pixels in a common data word that can be processed by the processor in a single operation instruction.

28. The camera of claim 23, wherein said processor is configured to identify an edge when the at least one string of connected pixels has a length that is at least as long as a depth of the predetermined area.

29. The camera of claim 23, wherein said search step includes searching adjacent pixels in parallel.

30. The camera of claim 23, wherein:
- said processor is configured to perform a logical AND operation on pixels in said predetermined area and perform a logical OR operation on connected strings of pixels within said predetermined area.

31. The camera of claim 23, wherein said image processor is configured to
- perform a logarithmic transformation on the plurality of pixels so as to separate a reflectance component from an illumination component.

32. The camera of claim 31, wherein said image processor is also configured to perform spatio-temporal filtering when reducing the first number of bits.

33. The camera of claim 32, wherein said image processor is also configured to perform a threshold operation on an absolute value of a result of said spatio-temporal filtering.

* * * * *